United States Patent
Ukai et al.

(10) Patent No.: US 8,398,944 B2
(45) Date of Patent: Mar. 19, 2013

(54) AIR POLLUTION CONTROL SYSTEM AND AIR POLLUTION CONTROL METHOD

(75) Inventors: Nobuyuki Ukai, Tokyo (JP); Moritoshi Murakami, Tokyo (JP); Susumu Okino, Tokyo (JP); Tatsuto Nagayasu, Tokyo (JP); Seiji Kagawa, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 63 days.

(21) Appl. No.: 13/059,852

(22) PCT Filed: Feb. 25, 2010

(86) PCT No.: PCT/JP2010/052955
§ 371 (c)(1),
(2), (4) Date: May 5, 2011

(87) PCT Pub. No.: WO2011/104840
PCT Pub. Date: Sep. 1, 2011

(65) Prior Publication Data
US 2011/0262331 A1    Oct. 27, 2011

(51) Int. Cl.
*B01D 53/34* (2006.01)
*B01D 53/50* (2006.01)
*B01D 53/56* (2006.01)
*B01D 53/64* (2006.01)
*B01D 53/74* (2006.01)
*B01D 53/77* (2006.01)

(52) U.S. Cl. .............. 423/210; 423/235; 423/239.1; 423/243.01; 423/243.11; 423/240 R; 423/168; 423/169; 423/170; 423/171; 423/177

(58) Field of Classification Search ............. 423/210, 423/235, 239.1, 243.01, 243.11, 240 R; 422/168–171, 177, 178
See application file for complete search history.

(56) References Cited

U.S. PATENT DOCUMENTS 4,022,869 A * 5/1977 Saitoh et al. ............. 423/240 R
5,569,436 A * 10/1996 Lerner ......................... 422/170

FOREIGN PATENT DOCUMENTS

JP    57-136921 A    8/1982
JP    59-090617 A    5/1984

(Continued)

OTHER PUBLICATIONS

International Search Report of PCT/JP2010/052955, date of mailing Apr. 6, 2010.

(Continued)

*Primary Examiner* — Timothy Vanoy
(74) *Attorney, Agent, or Firm* — Westerman, Hattori, Daniels & Adrian, LLP

(57) ABSTRACT

An air pollution control system 10A according to the present invention includes: a boiler 11 that burns fuel; $NO_x$ removal equipment 12 that decomposes nitrogen oxides in flue gas 25 discharged from the boiler 11; a desulfurizer 15 that causes sulfur oxides in the flue gas 25 having passed through the $NO_x$ removal equipment 12 to be absorbed by an absorbent, thereby reducing sulfur oxides in the flue gas 25, a waste-water treatment device 16 including a solid-liquid separating unit 31 that separates desulfurized waste water 28 discharged from the desulfurizer 15 into a solid fraction and a liquid fraction, and a mercury removing unit 32 that removes mercury in the desulfurized waste water 28; and a treated waste-water returning unit (a makeup water line) 17 that returns at least a part of treated waste water 40 treated by the waste-water treatment device 16 to the desulfurizer 15.

8 Claims, 5 Drawing Sheets

FOREIGN PATENT DOCUMENTS

| | | |
|---|---|---|
| JP | 63-200818 A | 8/1988 |
| JP | 2-211217 A | 8/1990 |
| JP | 9-313881 A | 12/1997 |
| JP | 2003-236334 A | 8/2003 |
| JP | 2005-152745 A | 6/2005 |
| JP | 2007-185558 A | 7/2007 |
| JP | 2009-166013 A | 7/2009 |
| JP | 2009-262081 A | 11/2009 |

OTHER PUBLICATIONS

Written Opinion of the Internatioanl Searching Authority, issued in corresponding International Application No. PCT/JP2010/052955.

* cited by examiner

AIR POLLUTION CONTROL SYSTEM AND AIR POLLUTION CONTROL METHOD

FIELD

The present invention relates to an air pollution control system and an air pollution control method for purifying flue gas discharged from a boiler.

BACKGROUND

Conventionally, there has been known an air pollution control system for treating flue gas discharged from a boiler installed in a thermal power generation plant or the like. The air pollution control system includes $NO_x$ removal equipment that removes nitrogen oxides from flue gas discharged from a boiler, an air heater that recovers heat of flue gas having passed through the $NO_x$ removal equipment, a precipitator that reduces dust in the flue gas after heat recovery, and a desulfurizer that reduces sulfur oxides in the flue gas after dust reduction. As the desulfurizer, a wet desulfurizer that reduces sulfur oxides in flue gas by bringing an absorbent such as a limestone slurry into gas-liquid contact with flue gas has been generally used.

In flue gas discharged from the boiler, harmful substances such as mercury may be contained in a small amount other than nitrogen oxides and sulfur oxides. In the air pollution control system described above, therefore, as a method of removing mercury in flue gas, such a method has been used that a chlorinating agent is gas-atomized on an upstream of high-temperature $NO_x$ removal equipment in a flue gas duct, mercury is oxidized (chlorinated) on an $NO_x$ removal catalyst to prepare soluble mercury chloride, and mercury chloride is dissolved in an absorbent by a wet desulfurizer on a downstream (see, for example, Patent Literature 1).

CITATION LIST

Patent Literature

Patent Literature 1: Japanese Patent Application Laid-open No. 2009-262081

SUMMARY

Technical Problem

In the mercury removal method described above, if mercury chloride in flue gas is dissolved in an absorbent, the mercury concentration in the absorbent increases and the phase of mercury is changed from liquid phase to gas phase due to gas-liquid equilibrium, thereby causing a problem that mercury scatters in flue gas in the desulfurizer.

Therefore, it has been desired to suppress scattering of mercury in flue gas in the desulfurizer.

The present invention has been achieved to solve the above problem, and an object of the present invention is to provide an air pollution control system and an air pollution control method capable of suppressing scattering of mercury in flue gas in a desulfurizer.

Solution to Problem

According to an aspect of the present invention, an air pollution control system includes: a boiler that burns fuel; a $NO_x$ removal equipment that decomposes nitrogen oxides in flue gas discharged from the boiler; and a desulfurizer that causes sulfur oxides in flue gas having passed through the $NO_x$ removal equipment to be absorbed by an absorbent, thereby reducing the sulfur oxides in the flue gas; a waste-water treatment device including a solid-liquid separating unit that separates desulfurized waste water discharged from the desulfurizer into a solid and a liquid, and a mercury removing unit that removes mercury in the desulfurized waste water; and a treated waste-water returning unit that returns at least a part of treated waste water treated by the waste-water treatment device to the desulfurizer.

Advantageously, in the air pollution control system, the mercury removing unit includes a separating unit that separates mercury solids from the desulfurized waste water by adding a coagulation aid into the desulfurized waste water to solidify the mercury.

Advantageously, in the air pollution control system, the waste-water treatment device includes a halogen-ion removing unit that removes halogen ions in the desulfurized waste water.

Advantageously, in the air pollution control system, the coagulation aid is sulfide, and the waste-water treatment device includes an auxiliary-agent oxidizing unit that oxidizes the coagulation aid contained in separate liquid in which the mercury solids have been separated.

Advantageously, the air pollution control system further includes: an air heater provided between the $NO_x$ removal equipment and the desulfurizer to recover heat of the flue gas; and a waste-water supplying unit installed at least at one position of a path for supplying fuel to the boiler, inside of the boiler, and inside of a flue gas duct between the boiler and the air heater, to supply a part of treated waste water treated by the waste-water treatment device.

Advantageously, in the air pollution control system, a bypass pipe is provided at least in one position parallel to the NOx removal equipment or parallel to the air heater, and the waste-water supplying unit is provided in the bypass pipe.

According to another aspect of the present invention, an air pollution control method includes: a $NO_x$ removing step of decomposing nitrogen oxides in flue gas discharged from a boiler that burns fuel by $NO_x$ removal equipment; a desulfurizing step of causing sulfur oxides in flue gas having passed through the $NO_x$ removal equipment to be absorbed by an absorbent in a desulfurizer, thereby reducing the sulfur oxides in the flue gas; a waste-water treating step including a solid-liquid separating step of separating desulfurized waste water discharged from the desulfurizer into a solid fraction and a liquid fraction, and a mercury removing step of removing mercury in the desulfurized waste water; and a treated waste-water returning step of returning at least a part of treated waste water treated at the waste-water treating step to the desulfurizer.

Advantageously, in the air pollution control method, the mercury removing step in the waste-water treating step is a step of separating mercury solids from the desulfurized waste water by adding a coagulation aid into the desulfurized waste water to solidify the mercury.

Advantageously, in the air pollution control method, the waste-water treating step includes a halogen-ion removing step of removing halogen ions in the desulfurized waste water.

Advantageously, in the air pollution control method, the coagulation aid is sulfide, and the waste-water treating step includes an oxidizing step of oxidizing the coagulation aid contained in separate liquid in which the mercury solids have been separated.

Advantageously, in the air pollution control method, an air heater that recovers heat of the flue gas is provided between the $NO_x$ removal equipment and the desulfurizer; and the air pollution control method further comprises a waste-water supplying step of supplying a part of treated waste water treated at the waste-water treating step to at least one of a path for supplying fuel to the boiler, inside of the boiler, and inside of a flue gas duct between the boiler and the air heater.

Advantageously, in the air pollution control method, a bypass pipe is provided at least in one position parallel to the NOx removal equipment or parallel to the air heater, and the treated waste water is supplied to inside of the bypass pipe.

Advantageous Effects of Invention

According to the air pollution control system and the air pollution control method of the present invention, treated waste water after mercury in desulfurized waste water discharged from a desulfurizer is removed is returned to the desulfurizer, thereby enabling to decrease the mercury concentration in an absorbent in the desulfurizer. As a result, scattering of mercury in flue gas in the desulfurizer can be suppressed.

DESCRIPTION OF EMBODIMENTS

Exemplary embodiments of the present invention will be explained below in detail with reference to the accompanying drawings. The present invention is not limited to the embodiments. In addition, constituent elements in the following embodiments include those that can be easily assumed by persons skilled in the art or that are substantially equivalent.

First Embodiment

Figure 1:
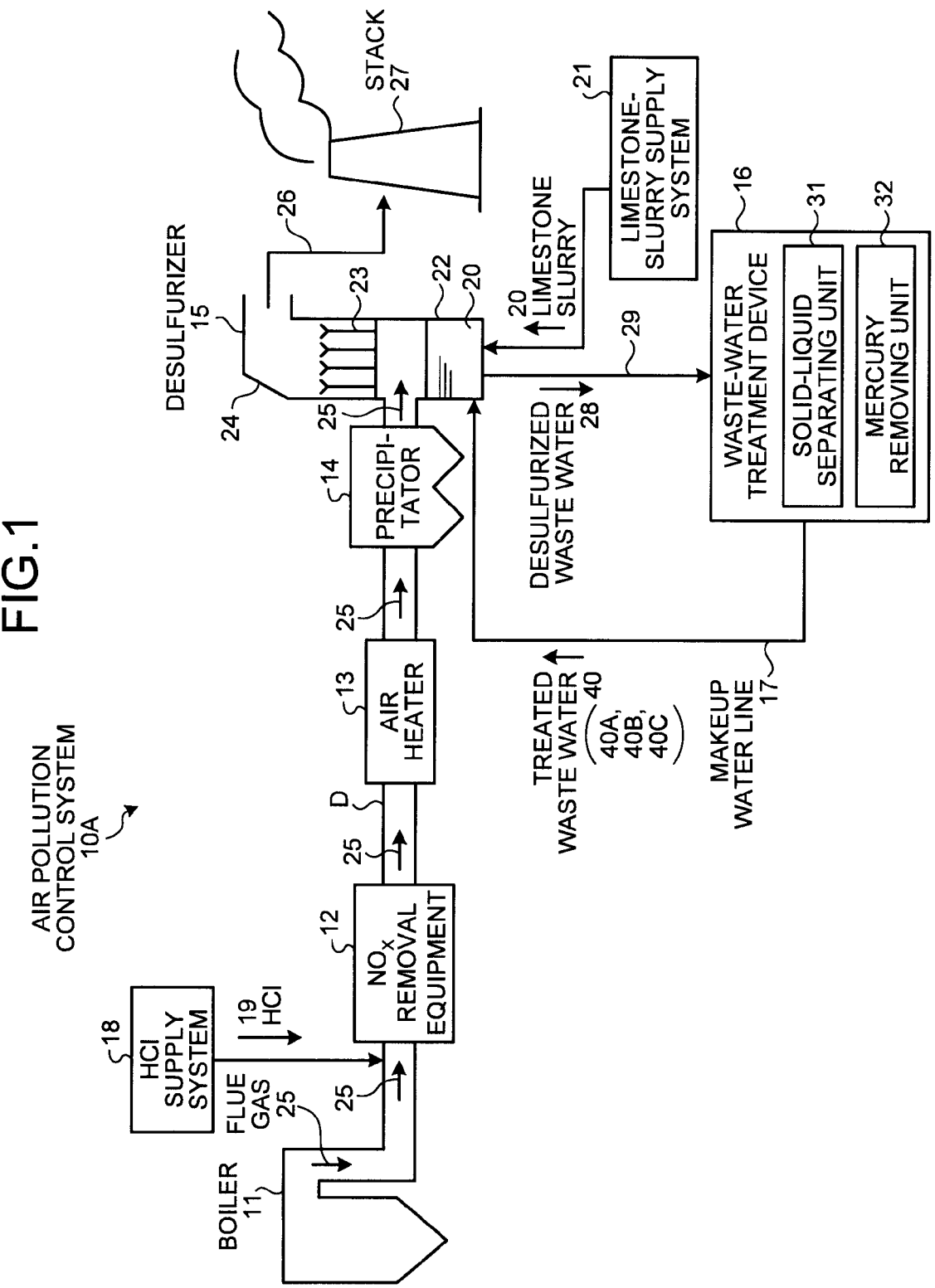
FIG. 1 is a schematic configuration diagram of an air pollution control system according to a first embodiment.

FIG. 1 is a schematic configuration diagram of an air pollution control system 10A according to a first embodiment. The air pollution control system 10A in FIG. 1 removes harmful substances such as nitrogen oxides ($NO_x$), sulfur oxides ($SO_x$), and mercury (Hg) from flue gas 25 discharged from a boiler 11 such as a coal combustion boiler that uses coals as a fuel or a heavy-oil combustion boiler that uses heavy oil as a fuel.

The air pollution control system 10A in FIG. 1 includes $NO_x$ removal equipment 12 that removes nitrogen oxides in the flue gas 25 from the boiler 11, an air heater 13 that recovers heat of the flue gas 25 having passed through the $NO_x$ removal equipment 12, a precipitator 14 that reduces dust in the flue gas 25 after heat recovery, a desulfurizer 15 that reduces sulfur oxides in the flue gas 25 after dust reduction according to a wet method, a waste-water treatment device 16 that removes harmful substances such as mercury from desulfurized waste water 28 discharged from the desulfurizer 15, and a treated waste-water returning unit 17 (hereinafter, "makeup water line") that returns at least a part of treated waste water 40 treated by the waste-water treatment device 16 to the desulfurizer 15. The boiler 11, the $NO_x$ removal equipment 12, the air heater 13, the precipitator 14, and the desulfurizer 15 are connected by one flue gas duct D, and the flue gas 25 discharged from the boiler 11 is purified through processes in the respective devices, and then discharged to outside from a stack 27. The air pollution control system 10A returns the treated waste water 40 (40A, 40B, and 40C), after harmful substances such as mercury contained in the desulfurized waste water 28 discharged from the desulfurizer 15 are removed, to the desulfurizer 15 so that the treated waste water 40 is circulated between the desulfurizer 15 and the waste-water treatment device 16. According to the configuration described above, the mercury concentration in an absorbent to be used in the desulfurizer 15 is decreased.

The $NO_x$ removal equipment 12 removes nitrogen oxides in the flue gas 25 from the boiler 11, and includes an $NO_x$ removal catalyst layer (not shown) therein. In a $NO_x$ removing process, the flue gas 25 introduced into the $NO_x$ removal equipment 12 comes in contact with the $NO_x$ removal catalyst layer, and nitrogen oxides in the flue gas 25 are decomposed into nitrogen gas ($N_2$) and water ($H_2O$) and removed. When a chlorine (Cl) content in the flue gas 25 increases, the proportion of a bivalent metallic mercury soluble in water increases, and mercury can be easily collected by the desulfurizer 15 described later. Therefore, as shown in FIG. 1, an HCl supply system 18 is installed on an upstream side of the $NO_x$ removal equipment 12 to supply hydrogen chloride (HCl) 19 into the flue gas 25 in the flue gas duct D from the HCl supply system 18. Accordingly, mercury contained in the flue gas 25 is oxidized (chlorinated) on the $NO_x$ removal catalyst, and converted to soluble mercury chloride (HgCl).

The air heater 13 is a heat exchanger that recovers heat in the flue gas 25 in which nitrogen oxides have been removed by the $NO_x$ removal equipment 12. Because the temperature of the flue gas 25 having passed through the $NO_x$ removal equipment 12 is as high as about 350° C. to 400° C., the air heater 13 performs heat exchange between the high-temperature flue gas 25 and combustion air at a normal temperature. Combustion air, which becomes high temperature by heat exchange, is supplied to the boiler 11. On the other hand, the flue gas 25 having been heat-exchanged with combustion air at a normal temperature is cooled to about 150° C.

The precipitator 14 reduces dust in the flue gas 25 after heat recovery. As the precipitator 14, a centrifugal precipitator, a filtering precipitator, and an electric precipitator can be mentioned; however, it is not particularly limited thereto.

The desulfurizer 15 reduces sulfur oxides in the flue gas 25 after dust reduction according to a wet method. In the desulfurizer 15, a limestone slurry 20 (a solution in which limestone powder is dissolved in water) is used as an alkaline absorbent, and the temperature inside the desulfurizer is adjusted to about 30° C. to 50° C. In a desulfurizing process, the limestone slurry 20 is supplied from a limestone-slurry supply system 21 to a column bottom part 22 of the desulfurizer 15. The limestone slurry 20 supplied to the column bottom part 22 of the desulfurizer 15 is supplied to a plurality of nozzles 23 in the desulfurizer 15 via an absorbent supply line (not shown), and is ejected from the nozzles 23 toward a column top part 24 of the desulfurizer 15. Because the flue gas 25 rising from the column bottom part 22 of the desulfurizer 15 comes in gas-liquid contact with the limestone slurry 20 ejected from the nozzles 23, sulfur oxides and mercury chloride in the flue gas 25 are absorbed by the limestone slurry 20, and separated and removed from the flue gas 25. The flue gas 25 purified by the limestone slurry 20 is discharged from the column top part 24 of the desulfurizer 15 as purged gas 26, and discharged to outside of the system from the stack 27.

At the inside of the desulfurizer 15, sulfur oxides $SO_x$ in the flue gas 25 causes a reaction with the limestone slurry 20 represented by the following expression (1).

$$CaCO_3+SO_2+0.5H_2O \rightarrow CaSO_2.0.5H_2O+CO_2 \quad (1)$$

The limestone slurry 20 that has absorbed $SO_x$ in the flue gas 25 is then oxidized by air (not shown) supplied to the column bottom part 22 of the desulfurizer 15, to cause a reaction with air represented by the following expression (2).

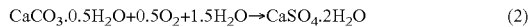
$$CaCO_3.0.5H_2O+0.5O_2+1.5H_2O \rightarrow CaSO_4.2H_2O \quad (2)$$

In this manner, $SO_x$ in the flue gas 25 is captured in a state of gypsum $CaSO_4.2H_2O$ in the desulfurizer 15.

As described above, while a solution accumulated in the column bottom part 22 of the desulfurizer 15 of a wet type and pumped is used as the limestone slurry 20, gypsum $CaSO_4.2H_2O$ is mixed in the limestone slurry 20 to be pumped by an operation of the desulfurizer 15, according to the above reaction expressions (1) and (2). The limestone gypsum slurry (a limestone slurry mixed with gypsum) to be pumped is hereinafter referred to as "absorbent".

The absorbent (the limestone gypsum slurry) used for desulfurization is discharged to outside from the column bottom part 22 of the desulfurizer 15 as the desulfurized waste water 28, and supplied to the waste-water treatment device 16 via a desulfurized waste-water line 29. As well as gypsum, heavy metal such as mercury and halogen ions such as $Cl^-$, $Br^-$, $I^-$, and $F^-$ are included in the desulfurized waste water 28.

In the desulfurizer 15, mercury Hg is adsorbed by produced gypsum $CaSO_4.2H_2O$ crystals to reduce mercury. A mercury reduction ratio with respect to a gypsum production amount varies according to the property of limestone, the halogen ion concentration, operating conditions of the desulfurizer or the like; however, the ratio is about 2 mg/kg (Hg reduction amount/$CaSO_4.2H_2O$ production amount). In coal having a high mercury content ratio (or low sulfur content ratio) with a ratio by weight being equal to or higher than 2 mg/kg, mercury may not be adsorbed on gypsum particles. In this case, the mercury concentration in supernatant liquid of a limestone gypsum slurry increases in the desulfurizer 15, and such a phenomenon occurs that a part of mercury in supernatant liquid scatters from supernatant liquid to a gas phase (flue gas) due to gas-liquid equilibrium. Therefore, the mercury concentration in supernatant liquid needs to be decreased in order to prevent scattering of mercury. As explained below, therefore, after the desulfurized waste water 28 is supplied to the waste-water treatment device 16 and a waste-water treating process including a solid-liquid separating process and a mercury removing process is performed, the treated waste water 40 is returned again to the desulfurizer 15 so that the treated waste water 40 is circulated between the desulfurizer 15 and the waste-water treatment device 16, thereby decreasing the mercury concentration in the absorbent.

Figure 2:
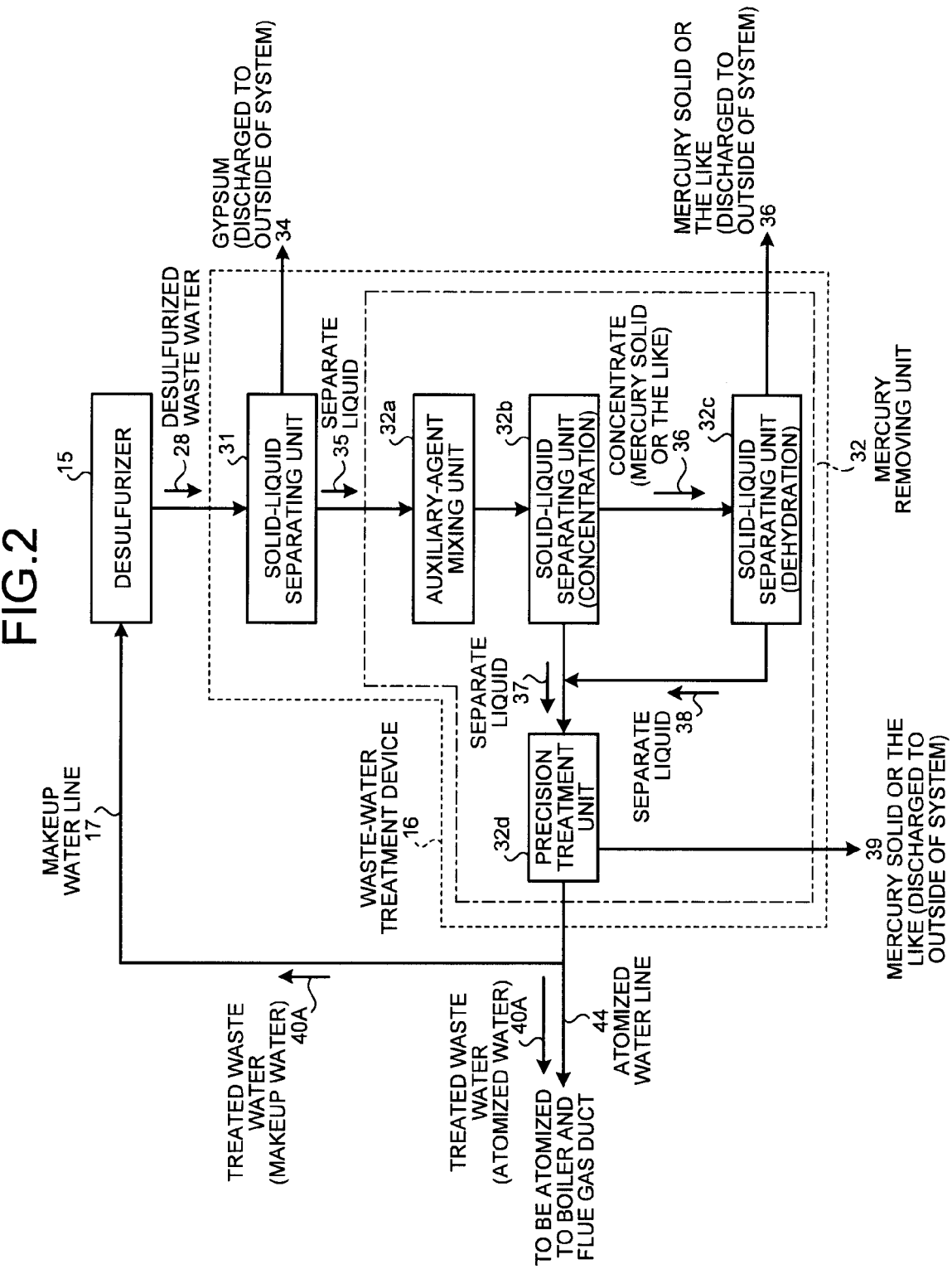
FIG. 2 is a configuration example of a waste-water treatment device according to the first embodiment.

FIG. 2 is a configuration example of the waste-water treatment device 16 shown in FIG. 1. The waste-water treatment device 16 exemplified in FIG. 2 includes a solid-liquid separating unit 31 that separates the desulfurized waste water 28 into a solid fraction including gypsum and a liquid fraction, and a unit 32 that removes substances such as mercury, boron, and selenium remaining in the desulfurized waste water 28 (hereinafter, "mercury removing unit 32").

As the solid-liquid separating unit 31, for example, a belt filter, a centrifugal separator, or a decanter type centrifugal settler is used. Gypsum 34 in the desulfurized waste water 28 discharged from the desulfurizer 15 is separated by the solid-liquid separating unit 31. At this time, mercury chloride in the desulfurized waste water 28 is separated from the liquid together with the gypsum 34 in a state of being adsorbed on gypsum. The separated gypsum 34 is discharged to outside of the air pollution control system (hereinafter, "outside of the system"). On the other hand, a small amount of substances such as mercury, boron, and selenium (mercury is specifically explained below as the substance) that cannot be adsorbed on the gypsum 34 is contained in separate liquid 35. These substances are removed by the mercury removing unit 32 described below.

In the mercury removing unit 32, mercury contained in the separate liquid 35 is solidified, and a mercury solid 36 or the like are separated from the separate liquid 35. In an example shown in FIG. 2, to perform highly accurate mercury removal, the mercury removing process includes multi-stage procedures. The mercury removing unit 32 includes an auxiliary-agent mixing unit 32a, a solid-liquid separating unit (concentrating unit) 32b, a solid-liquid separating unit (dehydrating unit) 32c, and a precision treatment unit 32d. The auxiliary-agent mixing unit 32a mixes a coagulation aid into the separate liquid 35 to solidify mercury, and then the solid-liquid separating unit (concentrating unit) 32b concentrates the mercury solid 36 and a particulate matter. As the concentrating unit, gravitational settling, sand filtration or the like is used. The solid-liquid separating unit (dehydrating unit) 32c dehydrates the concentrated mercury solid 36 and a particulate matter. As the dehydrating unit, centrifugal separation, a belt filter or the like is used. The dehydrated mercury solid 36 or the like are discharged to the outside of the system. Separate liquid 38 produced by the solid-liquid separating unit (dehydrating unit) 32c is mixed with the separate liquid 37 separated by the solid-liquid separating unit (concentrating unit) 32b and supplied to the precision treatment unit 32d, where a small amount of a mercury solid 39 and a particulate matter remaining in the separate liquid 37 is removed. As the precision treatment, a method using cyclone separation or membrane separation is used. The mercury solid 39 or the like removed by the mercury removing unit 32 is discharged to the outside of the system.

The treated waste water 40A in which the mercury solids 36 and 39 are removed by the mercury removing unit 32 is returned to the desulfurizer 15 as makeup water for the desulfurizer 15 via the makeup water line 17. The treated waste water 40A returned to the desulfurizer 15 is repeatedly used as an absorbent, and subjected to waste water treatment by the waste-water treatment device 16. That is, the treated waste water 40A is circulated between the desulfurizer 15 and the waste-water treatment device 16. An amount of the treated waste water 40A circulated via the waste-water treatment device 16 (an amount of the returned treated waste water 40A) is determined according to a setting level of the mercury concentration and halogen ion concentration in the absorbent in the desulfurizer 15. For example, when the mercury concentration in the absorbent is set low, the amount of the returned treated waste water 40A is increased.

In FIG. 2, a part of the treated waste water 40A treated by the waste-water treatment device 16 is supplied to an atomized water line 44 described later. This corresponds to a fourth embodiment described later, and in the first embodiment, the treated waste water 40A is not supplied to the atomized water line 44.

That is, in the first embodiment, when an amount of the treated waste water 40A treated by the waste-water treatment device 16 is equal to or less than a set value of an amount of makeup water set beforehand, all the treated waste water 40A is returned to the desulfurizer 15 as makeup water. On the other hand, when the amount of the treated waste water 40A is more than the set value of the amount of makeup water set beforehand, an excess amount of the treated waste water 40A is discharged to the outside of the system.

As described above, the air pollution control system 10A according to the first embodiment includes the waste-water treatment device 16 having the solid-liquid separating unit 31 that separates the desulfurized water 28 discharged from the desulfurizer 15 into a solid fraction and a liquid fraction, and the mercury removing unit 32 that removes mercury in the desulfurized water 28, and the makeup water line 17 for returning at least a part of the treated waste water 40 treated by the waste-water treatment device 16 to the desulfurizer 15. The desulfurized water 28 discharged from the desulfurizer 15 is supplied to the waste-water treatment device 16 to remove mercury, and at least a part of the treated waste water 40A after mercury removal is returned to the desulfurizer 15, so that the treated waste water 40A is circulated between the desulfurizer 15 and the waste-water treatment device 16, thereby enabling to decrease the mercury concentration in the absorbent in the desulfurizer 15. As a result, such a situation that mercury in the absorbent is changed from a liquid phase to a gas phase in the desulfurizer 15, and mercury scatters in the flue gas 25 can be suppressed.

Second Embodiment

Figure 3:
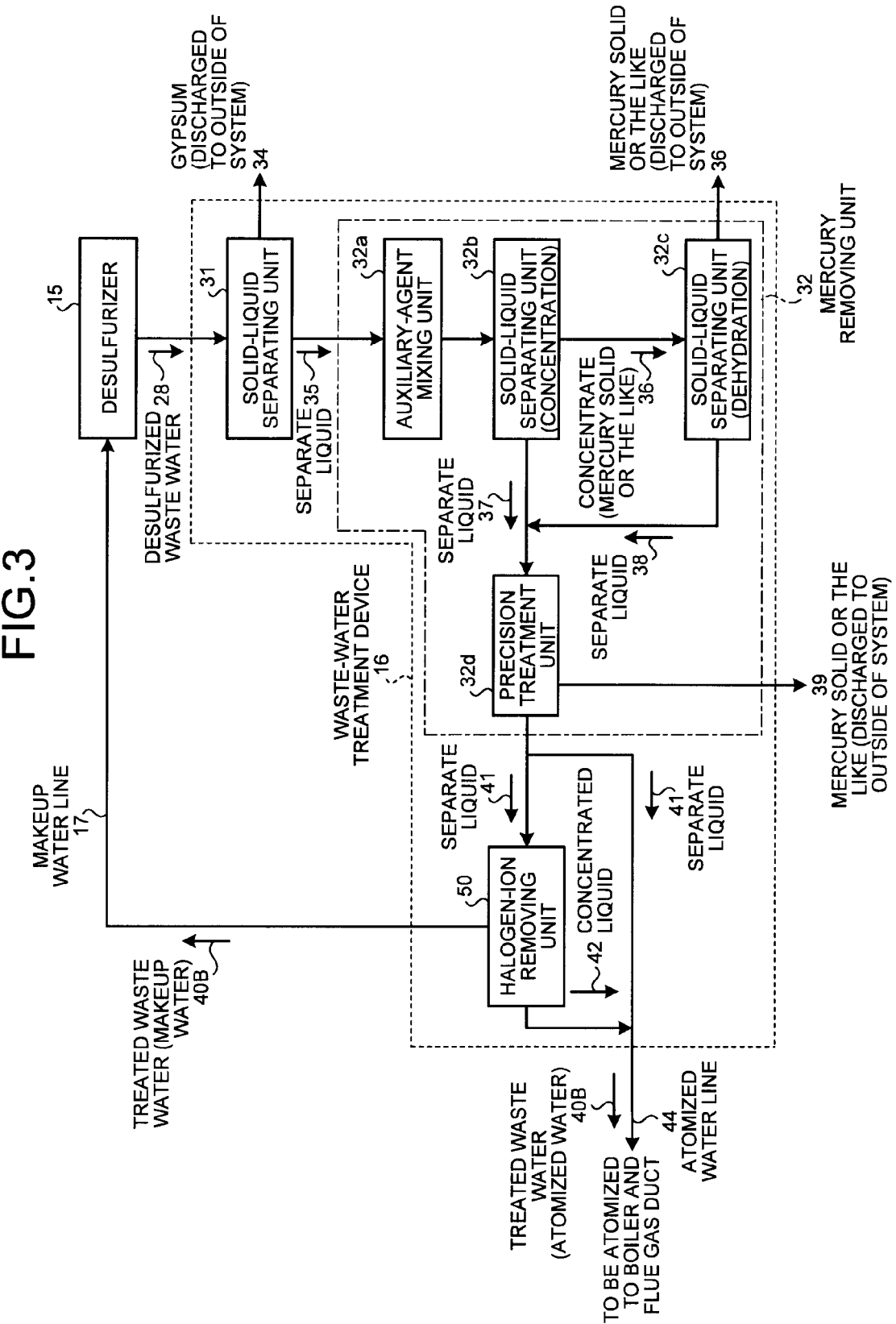
FIG. 3 is a configuration example of a waste-water treatment device according to a second embodiment.

An air pollution control system according to a second embodiment is explained next. Because constituent elements of the air pollution control system according to the second embodiment are identical to those of the air pollution control system 10A shown in FIG. 1, FIG. 1 is also used for explanations thereof. FIG. 3 is a configuration example of the waste-water treatment device 16 according to the second embodiment. The waste-water treatment device 16 shown in FIG. 3 includes a unit 50 that removes halogen ions such as chlorine ion ($Cl^-$), bromine ion ($Br^-$), iodine ion ($I^-$), and fluorine ion ($F^-$) (hereinafter, "halogen-ion removing unit 50") in addition to the configuration of the waste-water treatment device 16 explained in the first embodiment.

Halogen ions such as chlorine ion ($Cl^-$), bromine ion ($Br^-$), iodine ion ($I^-$), and fluorine ion ($F^-$) have such a property that adsorption of mercury by gypsum is suppressed in the desulfurizing process performed by the desulfurizer 15. Therefore, if the halogen ion concentration in treated waste water to be returned to the desulfurizer 15 is high, the mercury concentration in the supernatant liquid of the absorbent increases, and such a phenomenon occurs that a part of mercury in supernatant liquid scatters to the gas phase (flue gas). Therefore, it is desired that the halogen-ion removing unit 50 removes halogen ions from separate liquid 41 separated by the mercury removing unit 32, to decrease the halogen ion concentration. As the halogen-ion removing unit 50, a concentrating unit using a reverse osmosis membrane, a concentrating unit using an ion exchange membrane, a concentrating unit using electrodialysis can be mentioned, as well as a distillation or crystallization technique.

The treatment by the halogen-ion removing unit 50 can be performed every time when the separate liquid 41 is supplied from the mercury removing unit 32. However, a configuration can be such that the halogen ion concentration in the separate liquid 41 is measured, and the halogen ions are reduced only when the halogen ion concentration exceeds a set value, and when the halogen ion concentration is less than the set value, the treatment by the halogen-ion removing unit 50 can be omitted.

The treated waste water 40B in which halogen ions are concentrated and reduced by the halogen-ion removing unit 50 is returned to the desulfurizer 15 via the makeup water line 17 as makeup water for the desulfurizer 15. Similarly to the first embodiment, the amount of the treated waste water 40B circulated through the waste-water treatment device 16 is determined according to the setting level of the mercury concentration and the halogen ion concentration in the absorbent in the desulfurizer 15.

In FIG. 3, a part of the treated waste water 40B treated by the waste-water treatment device 16 is supplied to the atomized water line 44 described later. This corresponds to the fourth embodiment described later, and in the second embodiment, the treated waste water 40B is not supplied to the atomized water line 44. Further, in FIG. 3, concentrated liquid 42 produced by the halogen-ion removing unit 50 is mixed in the atomized water line 44. This also corresponds to the fourth embodiment, and in the second embodiment, the concentrated liquid 42 is discharged to the outside of the system.

Similarly to the first embodiment, when an amount of the treated waste water 40B treated by the waste-water treatment device 16 is equal to or less than a set value of an amount of makeup water set beforehand, all the treated waste water 40B is returned to the desulfurizer 15 as makeup water. On the other hand, when the amount of the treated waste water 40B is more than the set value of the amount of makeup water set beforehand, an excess amount of the treated waste water 40B is discharged to the outside of the system.

As explained above, the waste-water treatment device 16 in the air pollution control system 10A according to the second embodiment includes the halogen-ion removing unit 50 that removes halogen ions such as chlorine ion ($Cl^-$), bromine ion ($Br^-$), iodine ion ($I^-$), and fluorine ion ($F^-$) that suppress adsorption of mercury on gypsum, in addition to the configuration of the waste-water treatment device 16 explained in the first embodiment. According to the air pollution control system 10A of the second embodiment constituted as described above, in addition to effects of the first embodiment, the halogen ion concentration in the treated waste water 40 can be decreased. Accordingly, migration of mercury to gypsum (solidification) can be promoted, and scattering of mercury into the gas phase can be suppressed.

Third Embodiment

Figure 4:
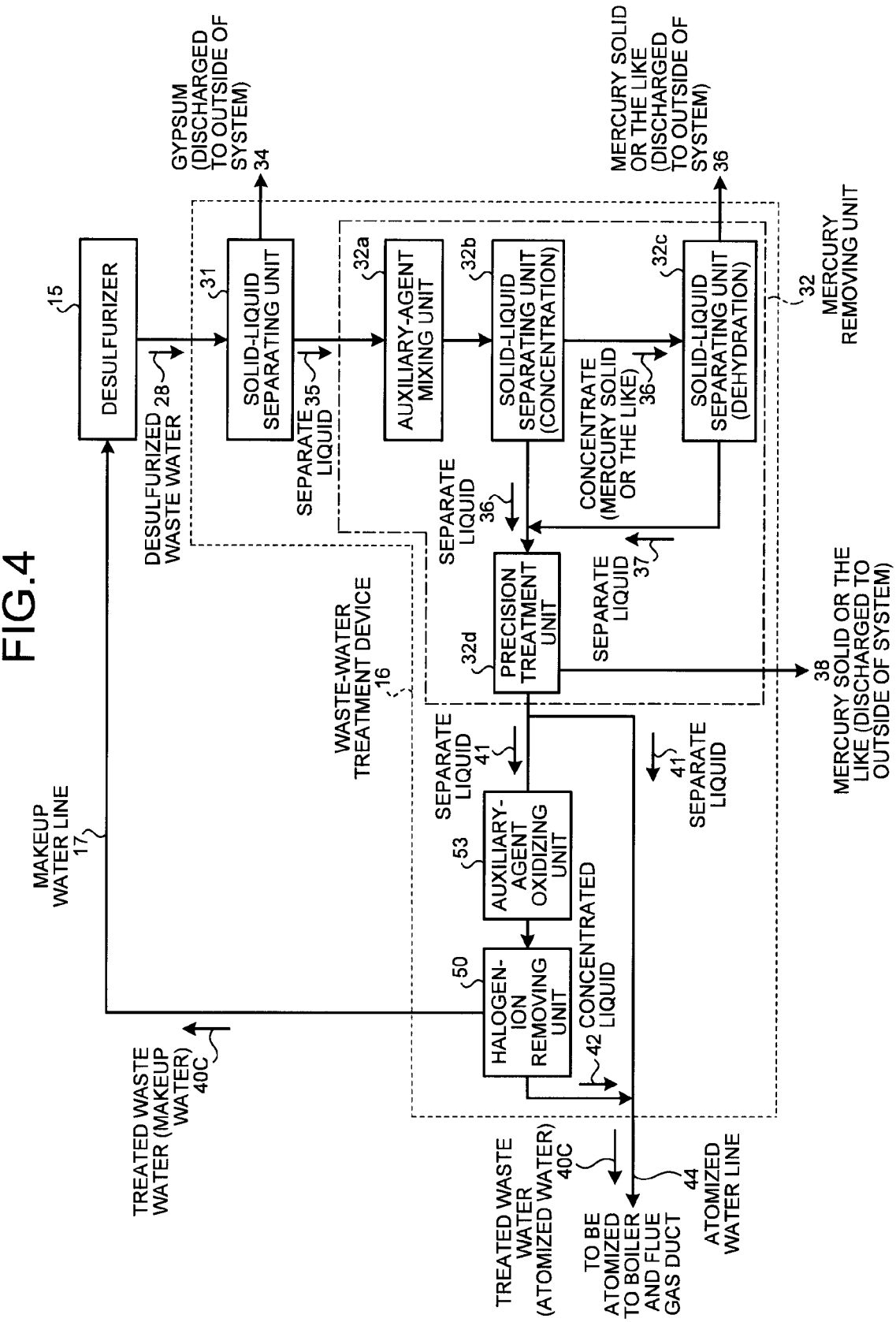
FIG. 4 is a configuration example of a waste-water treatment device according to a third embodiment.

An air pollution control system according to a third embodiment is explained next. Because constituent elements of the air pollution control system according to the third embodiment are identical to those of the air pollution control system 10A shown in FIG. 1, FIG. 1 is also used for explanations thereof. FIG. 4 is a configuration example of the waste-water treatment device 16 according to the third embodiment. The waste-water treatment device 16 shown in FIG. 4 includes an auxiliary-agent oxidizing unit 53 in addition to the configuration of the waste-water treatment device 16 explained in the second embodiment. In an auxiliary-agent mixing process performed by the mercury removing unit 32, when sulfide such as hydrogen sulfide $H_2S$, sodium sulfide $Na_2S$, sodium hydrogen sulfide NaHS, or metal sulfide $M_xS_y$ (M is a metal element such as Mn or Fe, and x and y are numbers) is used, a coagulation aid contained in the treated waste water 40 may act as a reducing agent to thereby inhibit oxidation, at the time of returning the treated waste water 40 to the desulfurizer 15. Therefore, when sulfide is used as the coagulation aid, it is desired that the auxiliary-agent oxidizing unit 53 subjects the coagulation aid contained in the separate liquid 41 separated by the precision treatment unit 32d to oxidation treatment. As the oxidation treatment, specifically, an oxidizing agent is added to cause sulfide to react with the oxidizing agent. As the oxidizing agent, air, oxygen $O_2$, hydrogen peroxide $H_2O_2$, ozone $O_3$, chloric acid compounds, manganese compounds, and iron compounds can be mentioned.

Halogen ions in the separate liquid 41 subjected to the treatment by the auxiliary-agent oxidizing unit 53 are concentrated and removed by the halogen-ion removing unit 50. The treated waste water 40C in which halogen ions are removed is returned to the desulfurizer 15 via the makeup water line 17 as makeup water for the desulfurizer 15. Similarly to the first embodiment, the amount of the treated waste water 40C circulated through the waste-water treatment device 16 is determined according to the setting level of the mercury concentration and halogen ion concentration in the absorbent in the desulfurizer 15.

In FIG. 4, a part of the treated waste water 40C treated by the waste-water treatment device 16 is supplied to the atomized water line 44 described later. This corresponds to the fourth embodiment described later, and in the third embodiment, the treated waste water 40C is not supplied to the atomized water line 44. Further, in FIG. 4, the concentrated liquid 42 produced by the halogen-ion removing unit 50 is mixed in the atomized water line 44. This also corresponds to the fourth embodiment, and in the third embodiment, the concentrated liquid 42 is discharged to the outside of the system.

Similarly to the first embodiment, when an amount of the treated waste water 40C treated by the waste-water treatment device 16 is equal to or less than a set value of an amount of makeup water set beforehand, all the treated waste water 40C is returned to the desulfurizer 15 as makeup water. On the other hand, when the amount of the treated waste water 40C is more than the set value of the amount of makeup water set beforehand, an excess amount of the treated waste water 40C is discharged to the outside of the system.

As described above, the waste-water treatment device 16 in the air pollution control system 10A according to the third embodiment includes the auxiliary-agent oxidizing unit 53 that oxidizes the coagulation aid in addition to the configuration of the waste-water treatment device 16 explained in the second embodiment. According to the air pollution control system 10A of the third embodiment constituted as described above, in addition to effects of the first and second embodiments, such a situation can be prevented that the coagulation aid contained in the treated waste water 40 acts as a reducing agent to inhibit oxidation, at the time of returning the treated waste water 40 to the desulfurizer 15.

The configurations of the waste-water treatment device 16 exemplified in FIGS. 2 to 4 are only examples, and can be appropriately changed according to the property or the like of the desulfurized waste water 28. For example, in the examples shown in FIGS. 2 to 4, the mercury removing unit 32 is constituted by multiple stages of a concentrating process, a dehydrating process, and a precision treatment process to remove mercury highly accurately. However, the mercury removing unit 32 does not need to have multiple stages, and any one of these processes can be selected and performed. For example, the configuration may be such that the mercury concentration in the separate liquid 37 is measured, and when the mercury concentration is less than a threshold, the precision treatment unit 32d can be omitted. Further, when a coagulation aid other than sulfide is used, it is a matter of course that the oxidation treatment of the coagulation aid (detoxification treatment) can be omitted.

Further, the order of the treatment by the solid-liquid separating unit 31, the mercury removing unit 32, and the halogen-ion removing unit 50 is not limited to the example shown in FIG. 2. For example, the treatment by the solid-liquid separating unit 31 can be performed after performing the treatment by the mercury removing unit 32, or the treatment by the mercury removing unit 32 can be performed after performing the treatment by the halogen-ion removing unit 50.

Fourth Embodiment

Figure 5:
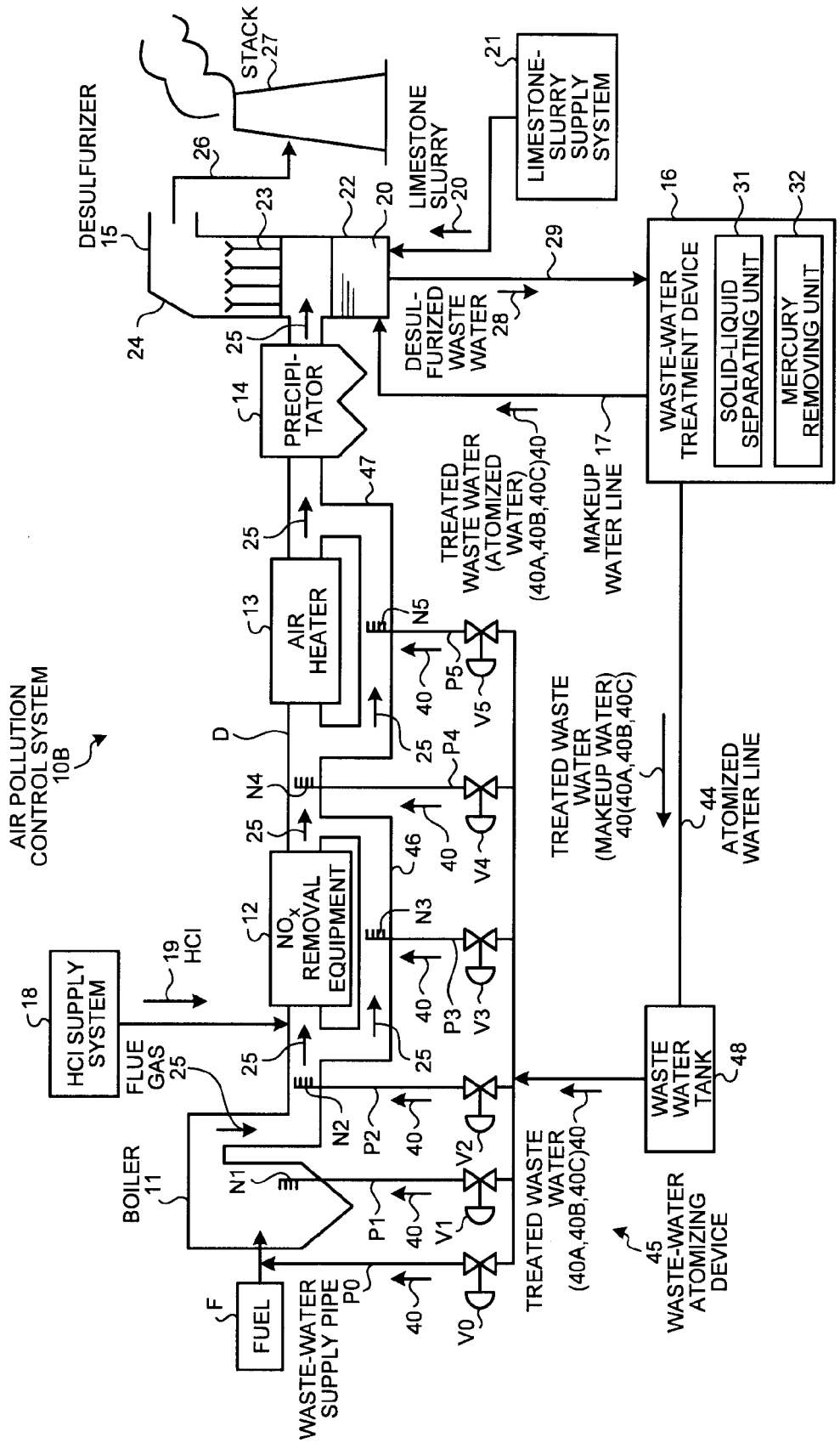
FIG. 5 is a schematic configuration diagram of an air pollution control system according to a fourth embodiment.

An air pollution control system according to a fourth embodiment is explained below. Constituent elements identical to those in the first to third embodiments are denoted by like reference signs, and explanations thereof will be omitted. FIG. 5 is a schematic configuration diagram of an air pollution control system 10B according to the fourth embodiment. In the first to third embodiments, it is explained that after the desulfurized waste water 28 discharged from the desulfurizer 15 is subjected to waste water treatment, the treated waste water 40 is returned to the desulfurizer 15 as makeup water. However, in the air pollution control system 10B according to the fourth embodiment, in addition to the configurations according to the first to third embodiments, a part of the treated waste water 40 is atomized to at least one of a path for supplying the fuel F to the boiler 11, the inside of a furnace of the boiler 11, the inside of the flue gas duct D between the boiler 11 and the air heater 13, and the inside of the bypass pipe 46 and a bypass pipe 47.

The air pollution control system 10B exemplified in FIG. 5 includes the atomized water line 44 and a waste-water atomizing device 45 in addition to the boiler 11, the $NO_x$ removal equipment 12, the air heater 13, the precipitator 14, the desulfurizer 15, the waste-water treatment device 16, and the makeup water line 17. Further, the bypass pipe 46 for connecting the flue gas duct D on an upstream side and on a downstream side of the $NO_x$ removal equipment 12 is provided at a position parallel to the $NO_x$ removal equipment 12. Likewise, the bypass pipe 47 for connecting the flue gas duct D on an upstream side and on a downstream side of the air heater 13 is provided at a position parallel to the air heater 13. By having such a configuration, the treated waste water 40 can be atomized also into the flue gas 25 circulating in the respective bypass pipes 46 and 47. The respective bypass pipes 46 and 47 are configured such that an amount of flue gas circulating therein becomes about several percents of the amount of flue gas circulating in the flue gas duct D.

A predetermined amount of the treated waste water 40 treated by the waste-water treatment device 16 is returned to the desulfurizer 15 via the makeup water line 17. However, when there is excessive treated waste water 40 after the treated waste water 40 is returned to the desulfurizer 15, the remaining treated waste water 40 is supplied to the atomized water line 44, so that the treated waste water 40 is supplied to the path for supplying the fuel F to the boiler 11, the inside of a furnace of the boiler 11, the inside of the flue gas duct D, and the inside of the bypass pipes 46 and 47 by the waste-water atomizing device 45.

For example, when the amount of treated waste water 40 treated by the waste-water treatment device 16 is equal to or less than the set value of the amount of makeup water set beforehand, all the treated waste water 40 is returned to the desulfurizer 15 as makeup water. On the other hand, when the amount of the treated waste water 40 is more than the set value of the amount of makeup water set beforehand, an excess amount of the treated waste water 40 is supplied to the atomized water line 44, so that the waste-water atomizing device 45 supplies the treated waste water 40 to the path for supplying the fuel F to the boiler 11, and to the inside of the boiler 11, the flue gas duct D, and the bypass pipes 46 and 47. Further, when the amount of the treated waste water 40 treated by the waste-water treatment device 16 is more than the sum of a set value of the amount of makeup water set beforehand and a set value of an amount of atomized water set beforehand, the excess amount of the treated waste water 40 is discharged to the outside of the system.

Similarly to the first to third embodiments, the amount of the treated waste water 40 (makeup water) to be returned to the desulfurizer 15 is determined according to a setting level of the mercury concentration and halogen ion concentration in the absorbent in the desulfurizer 15. On the other hand, the amount of the treated waste water 40 (makeup water) to be atomized to the inside of a furnace of the boiler 11, the inside of the flue gas duct D, and the inside of the bypass pipes 46 and 47 is determined according to the amount of the treated waste water 40 produced in proportion to the treated amount of the flue gas 25 and an amount limit of the treated waste water 40 that can be discharged to the outside of the system.

Any one of the configurations explained in the first embodiment (FIG. 2) to the third embodiment (FIG. 4) is applied to the waste-water treatment device 16. For example, when the waste-water treatment device 16 includes the solid-liquid separating unit 31 and the mercury removing unit 32 as shown in FIG. 2, a part of the treated waste water 40A treated in the mercury removing unit 32 is supplied to the atomized water line 44.

Further, when the waste-water treatment device 16 includes the mercury removing unit 32 and the halogen-ion removing unit 50 as shown in FIG. 3, the separate liquid 41 treated in the mercury removing unit 32, or liquid in which the concentrated liquid 42 of halogen ions is mixed with the separate liquid 41 is supplied to the atomized water line 44 as the treated waste water 40B. For example, when the treated waste water 40 is to be atomized into the flue gas duct D on an upstream side of the $NO_x$ removal equipment 12, mixed liquid of the concentrated liquid 42 of halogen ions and the separate liquid 41 is supplied to the atomized water line 44 as the treated waste water 40B, and atomized into the flue gas duct D. Accordingly, the concentration of chlorine ions in the flue gas 25 can be increased, thereby enabling to increase conversion efficiency of mercury chloride in the $NO_x$ removal equipment 12. On the other hand, when the treated waste water 40B is to be atomized into the flue gas duct D on a downstream side of the $NO_x$ removal equipment 12 and into the bypass pipes 46 and 47, the concentrated liquid 42 of halogen ions is not mixed, and only the separate liquid 41 is supplied to the atomized water line 44 as the treated waste water 40B, and atomized into the flue gas duct D and the bypass pipes 46 and 47. The same treatment is performed when the waste-water treatment device 16 includes the solid-liquid separating unit 31, the mercury removing unit 32, the auxiliary-agent oxidizing unit 53, and the halogen-ion removing unit 50 as shown in FIG. 4.

The waste-water atomizing device 45 includes a waste water tank 48 connected to the waste-water treatment device 16 via the atomized water line 44 to accumulate the treated waste water (atomized water) 40, and a plurality of waste-water supply pipes (waste-water supplying units) P0 to P5 respectively connected to the waste water tank 48 to supply the treated waste water 40 accumulated in the waste water tank 48 into the path for supplying the fuel F to the boiler 11, the inside of a furnace of the boiler 11, the inside of the flue gas duct D, and the inside of the bypass pipes 46 and 47. Nozzles N1 to N5 for atomizing the treated waste water 40 are provided at the ends of the waste-water supplying pipes P1 to P5.

The waste-water supplying pipes P0 to P5 are installed at positions where the high-temperature flue gas 25 before heat recovery by the air heater 13 is circulated, that is, on the upstream side of the air heater 13. In the example shown in FIG. 5, the waste-water supplying pipe P1 is connected to the boiler 11, and the nozzle N1 is installed at the inside of a furnace of the boiler 11. Specifically, the nozzle N1 is installed on the side of a furnace or on a furnace wall in an upper part of the furnace, so that the desulfurized waste water 28 is atomized from the nozzle N1 toward a flame portion at the center of the furnace or above the flame. The waste-water supplying pipe P2 is connected to the flue gas duct D between the boiler 11 and the $NO_x$ removal equipment 12, and the nozzle N2 is installed at the inside of the flue gas duct D. The waste-water supplying pipe P3 is connected to the bypass pipe 46 for connecting the flue gas ducts D on the upstream side and on the downstream side of the $NO_x$ removal equipment 12, and the nozzle N3 is installed at the inside of the bypass pipe 46. The waste-water supplying pipe P4 is connected to the flue gas duct D between the $NO_x$ removal equipment 12 and the air heater 13, and the nozzle N4 is installed at the inside of the flue gas duct D. The waste-water supplying pipe P5 is connected to the bypass pipe 47 for connecting the flue gas ducts D on the upstream side and on the downstream side of the air heater 13, and the nozzle N5 is installed at the inside of the bypass pipe 47.

As the nozzles N1 to N5, for example, a two-fluid nozzle or a rotary atomizer is used. It is desired that a mist diameter of the nozzles N1 to N5 is such that a maximum particle diameter is equal to or less than 200 micrometers and an average particle diameter is from 30 to 70 micrometers. Accordingly, contact efficiency with the flue gas 25 is improved, thereby enabling to improve evaporation efficiency.

The flue gas temperature in a furnace of the boiler 11 where the nozzle N1 is installed is as high as 800° C. to 1200° C., which is the highest temperature in the system, and thus a largest amount of the treated waste water 40 can be evaporated. Further, the flue gas temperature inside the flue gas duct D where the nozzle N2 is installed is about 500° C., and the flue gas temperature inside the flue gas duct D where the nozzle N4 is installed and in the bypass pipes 46 and 47 where the nozzles N3 and N5 are installed is respectively about 350° C. to 400° C., and although the temperature is lower than that in the furnace of the boiler 11, the treated waste water 40 can be reliably evaporated. On the other hand, the temperature of the flue gas 25 having passed through the air heater 13 decreases to about 150° C., and thus the treated waste water 40 cannot be evaporated sufficiently.

The waste-water supplying pipe P0 is installed in the path for supplying the fuel F to the boiler 11. The path for supplying the fuel F to the boiler 11 is, specifically, inside of a fuel supply system (not shown) or a pipe for connecting the fuel supply system and the boiler 11. The treated waste water 40 supplied from the waste-water supplying pipe P0 into the fuel F is mixed with the fuel F, input to the boiler 11 together with the fuel F, and evaporated in the boiler.

Opening/closing valves V0 to V5 are respectively installed in the waste-water supplying pipes P0 to P5, and by controlling an opening/closing degree of the opening/closing valves V0 to V5, a flow rate of the treated waste water 40 to be supplied to the waste-water supplying pipes P0 to P5 is adjusted. The treated waste water 40 accumulated in the waste water tank 48 is atomized respectively into the path for supplying the fuel F to the boiler 11, the inside of a furnace of the boiler 11, the inside of the flue gas duct D, and the inside of the bypass pipes 46 and 47, through the waste-water supplying pipes P1 to P5.

The treated waste water 40 atomized from the nozzles N1 to N5 into the high-temperature flue gas 25 is evaporated to become water vapor, and thereafter, supplied into the desulfurizer 15 together with the flue gas 25. Because the temperature in the desulfurizer 15 is as high as 30° C. to 50° C., most of the water vapor introduced into the desulfurizer 15 is devolatilized, and mixed with the limestone slurry 20 in the column bottom part 22. Meanwhile, the water vapor, which is not devolatilized, is discharged from the stack 27 together with the purged gas 26.

As described above, the temperature of the flue gas 25 is different according to positions in the flue gas duct D, and evaporation efficiency of the desulfurized waste water 28 is also different. Therefore, the opening/closing degree of the valves V0 to V5 is optimized, taking into consideration delivery efficiency of dry particles and evaporation efficiency of the flue gas 25.

As explained above, in the air pollution control system 10B according to the fourth embodiment, the waste-water supplying pipes P0 to P5 that supply the treated waste water 40 to at least one of the path for supplying the fuel F to the boiler 11, the inside of a furnace of the boiler 11, the inside of the flue gas duct D, and the inside of the bypass pipes 46 and 47 are installed, in addition to the configuration of the first to third embodiments. At least a part of the treated waste water 40 treated by the waste-water treatment device 16 is returned to the desulfurizer 15 as makeup water, whereas a part of the treated waste water 40 is supplied to the path for supplying the fuel F to the boiler 11, the inside of a furnace of the boiler 11, the inside of the flue gas duct D or the like. That is, in the fourth embodiment, in addition to returning the treated waste water 40 to the desulfurizer 15 as makeup water, a part of the treated waste water 40 is supplied to the boiler 11, the flue gas duct D or the like. Therefore, the treated waste water 40 treated by the waste-water treatment device 16 can be reused to a maximum extent, in addition to effects in the first to third embodiments, and all the treated waste water 40 can be reused in the air pollution control system 10B. As a result, discharge of waste water to the outside of the system can be considerably decreased, or can be eliminated completely.

Because the treated waste water 40 is directly atomized into the high-temperature flue gas 25 before heat recovery by the air heater 13, even if the amount of the treated waste water 40 to be atomized from the nozzles N1 to N5 is large, the treated waste water 40 can be evaporated reliably, and an amount of the treated waste water 40 to be returned to the flue gas duct D per unit time can be increased. As a result, the amount of the desulfurized waste water 28 per unit time can be increased, thereby enabling to increase throughput of flue gas per unit time as compared to conventional methods.

Further, the bypass pipes 46 and 47 are provided respectively at positions parallel to the $NO_x$ removal equipment 12 and the air heater 13, and the treated waste water 40 is atomized into the flue gas 25 inside the bypass pipes 46 and 47 and evaporated. Therefore, when there is a possibility that dry particles such as ash generated due to evaporation of the treated waste water 40 pass through the $NO_x$ removal equipment 12 and the air heater 13 to decrease effects of these devices, dry particles can be efficiently delivered to the downstream side of the $NO_x$ removal equipment 12 and the air heater 13 via the respective bypass pipes 46 and 47.

The configuration of the waste-water atomizing device 45 shown in FIG. 5 is only an example, and the number of installation and installation positions of the waste-water supplying pipes P0 to P5 are not limited thereto, and can be appropriately changed according to the amount of the treated waste water 40 and the kind of the flue gas 25. That is, the waste-water supplying pipes P0 to P5 only need to be installed at least at one position of the path for supplying the fuel F to the boiler 11, the inside of a furnace of the boiler 11, the flue gas duct D from an outlet of the boiler 11 to an inlet of the air heater, and the bypass pipes 46 and 47.

Further, when harmful substances and solid contents are contained in the treated waste water 40 only in a small amount, and even if the treated waste water 40 is atomized into the flue gas duct D on the upstream side of the $NO_x$ removal equipment 12 and the air heater 13, there is no possibility of decreasing effects of these devices, the bypass pipes 46 and 47 do not need to be provided. In the waste-water atomizing device 45 shown in FIG. 5, the treated waste water 40 from the waste-water treatment device 16 is temporarily accumulated in the waste water tank 48, and the treated waste water 40 is supplied from the waste water tank 48 to the waste-water supplying pipes P0 to P5. However, the treated waste water 40 supplied from the waste-water treatment device 16 via the atomized water line 44 can be directly supplied to the waste-water supplying pipes P0 to P5.

INDUSTRIAL APPLICABILITY

As describe above, according to the air pollution control system and the air pollution control method of the present invention, because it is possible to decrease the mercury concentration in an absorbent in a desulfurizer, scattering of mercury in flue gas in the desulfurizer can be suppressed.

REFERENCE SIGNS LIST 10A, 10B air pollution control system
11 boiler
12 $NO_x$ removal equipment
13 air heater
14 precipitator
15 desulfurizer
16 waste-water treatment device
17 makeup water line (treated waste-water returning unit)
18 HCl supply system
19 hydrogen chloride
20 limestone slurry
21 limestone-slurry supply system
22 column bottom part
23 nozzle
24 column top part
26 purged gas
27 stack
28 desulfurized waste water
29 desulfurized waste-water line
31 solid-liquid separating unit
32 mercury removing unit
40 (40A, 40B, 40C) treated waste water
44 atomized water line
45 waste-water atomizing device
46, 47 bypass pipe
48 waste water tank
50 halogen-ion removing unit
53 auxiliary-agent oxidizing unit
P0, P1, P2, P3, P4, P5 waste-water supply pipe (waste-water supplying unit)
N1, N2, N3, N4, N5 nozzle
F fuel

The invention claimed is:

1. An air pollution control system comprising:
a boiler that burns fuel;
a $NO_x$ removal equipment that decomposes nitrogen oxides in flue gas discharged from the boiler; and
a desulfurizer that causes sulfur oxides in flue gas having passed through the $NO_x$ removal equipment to be absorbed by an absorbent, thereby reducing the sulfur oxides in the flue gas;
a waste-water treatment device including a solid-liquid separating unit that separates desulfurized waste water discharged from the desulfurizer into a solid and a liquid, and a mercury removing unit that removes mercury in the desulfurized waste water; and
a treated waste-water returning unit that returns at least a part of treated waste water treated by the waste-water treatment device to the desulfurizer, wherein
the mercury removing unit includes a separating unit that separates mercury solids from the desulfurized waste water by adding a coagulation aid into the desulfurized waste water to solidify the mercury,
the coagulation aid is sulfide, and
the waste-water treatment device includes an auxiliary-agent oxidizing unit that oxidizes the coagulation aid contained in separate liquid in which the mercury solids have been separated.

2. The air pollution control system according to claim 1, wherein the waste-water treatment device includes a halogen-ion removing unit that removes halogen ions in the desulfurized waste water.

3. The air pollution control system according to claim 1, further comprising:
an air heater provided between the $NO_x$ removal equipment and the desulfurizer to recover heat of the flue gas; and
a waste-water supplying unit installed at least at one position of a path for supplying fuel to the boiler, inside of the boiler, and inside of a flue gas duct between the boiler and the air heater, to supply a part of treated waste water treated by the waste-water treatment device.

4. The air pollution control system according to claim 3, wherein a bypass pipe is provided at least in one position parallel to the $NO_x$ removal equipment or parallel to the air heater, and the waste-water supplying unit is provided in the bypass pipe.

5. An air pollution control method comprising:
a $NO_x$ removing step of decomposing nitrogen oxides in flue gas discharged from a boiler that burns fuel by $NO_x$ removal equipment;
a desulfurizing step of causing sulfur oxides in flue gas having passed through the $NO_x$ removal equipment to be absorbed by an absorbent in a desulfurizer, thereby reducing the sulfur oxides in the flue gas;
a waste-water treating step including a solid-liquid separating step of separating desulfurized waste water discharged from the desulfurizer into a solid fraction and a liquid fraction, and a mercury removing step of removing mercury in the desulfurized waste water; and
a treated waste-water returning step of returning at least a part of treated waste water treated at the waste-water treating step to the desulfurizer, wherein
the mercury removing step in the waste-water treating step is a step of separating mercury solids from the desulfurized waste water by adding a coagulation aid into the desulfurized waste water to solidify the mercury,
the coagulation aid is sulfide, and
the waste-water treating step includes an oxidizing step of oxidizing the coagulation aid contained in separate liquid in which the mercury solids have been separated.

6. The air pollution control method according to claim 5, wherein the waste-water treating step includes a halogen-ion removing step of removing halogen ions in the desulfurized waste water.

7. The air pollution control method according to claim 5, wherein
an air heater that recovers heat of the flue gas is provided between the $NO_x$ removal equipment and the desulfurizer; and
the air pollution control method further comprises a waste-water supplying step of supplying a part of treated waste water treated at the waste-water treating step to at least one of a path for supplying fuel to the boiler, inside of the boiler, and inside of a flue gas duct between the boiler and the air heater.

8. The air pollution control method according to claim 7, wherein a bypass pipe is provided at least in one position parallel to the $NO_x$ removal equipment or parallel to the air heater, and the treated waste water is supplied to inside of the bypass pipe.

* * * * *